United States Patent [19]
Wolf et al.

[11] Patent Number: 5,788,322
[45] Date of Patent: Aug. 4, 1998

[54] BODY STRUCTURE FOR A REAR CARRIAGE OF A CONVERTIBLE

[75] Inventors: Andreas M. Wolf, Parkland, Fla.; Jim Pavelek, Richmond, Mich.

[73] Assignee: Dr. Ing. h.c.F. Porsche AG, Weissach, Germany

[21] Appl. No.: 572,241

[22] Filed: Dec. 13, 1995

[51] Int. Cl.$^6$ ............................................ B62D 25/08
[52] U.S. Cl. ................... 296/186; 296/188; 296/203; 296/204
[58] Field of Search ...................... 296/186, 185, 296/188, 203, 204, 195, 205, 189, 107, 193, 194

[56] References Cited

U.S. PATENT DOCUMENTS

| | | | |
|---|---|---|---|
| 4,747,636 | 5/1988 | Harasaki et al. | 296/186 |
| 4,950,025 | 8/1990 | Yoshii | 296/195 |
| 5,110,177 | 5/1992 | Akio | 296/195 |
| 5,180,206 | 1/1993 | Toyoda | 296/195 X |
| 5,660,428 | 8/1997 | Catlin | 296/189 X |

FOREIGN PATENT DOCUMENTS

| | | | |
|---|---|---|---|
| 872164 | 3/1953 | Germany | 296/188 |
| 3419002 | 11/1985 | Germany | 296/188 |
| 405338558 | 12/1993 | Japan | 296/188 |
| 406206577 | 7/1994 | Japan | 296/203 |
| 336702 | 4/1959 | Switzerland | 296/203 |

OTHER PUBLICATIONS

"The new Mercedes–Benz Roadster—Body: Passive Safety" in *ATZ* 91 (1989) 5, pp. 227–235 (see English summary).

*Primary Examiner*—Dennis H. Pedder
*Attorney, Agent, or Firm*—Evenson, McKeown, Edwards & Lenahan, P.L.L.C.

[57] ABSTRACT

A body structure for a rear carriage of a vehicle, particularly a convertible has a folding-top compartment and a rear wall which is disposed in front of the folding-top compartment and which is connected to a floor and laterally exterior side rail structures. The folding-top compartment bottom is connected with the rear wall. For increasing the torsional and bending rigidity of the body structure, the forces transmitted from the rearward chassis to the body structure are, on the one hand, directed by way of the adjoining side rail structures and, on the other hand, by way of an upper cross member into a central force flux center point. Depending on the load, the forces at the central force flux center point are transmitted into several members of a rear-wall-side hollow member structure. The ends of the members of the hollow member structure which face away from the force flux center point are connected to the exterior side rail structures.

30 Claims, 8 Drawing Sheets

BODY STRUCTURE FOR A REAR CARRIAGE OF A CONVERTIBLE

BACKGROUND AND SUMMARY OF THE INVENTION

This invention relates to a body structure for a rear carriage of a vehicle, particularly of a convertible, comprising a folding-top compartment and a transversely extending rear wall which is disposed in front of the folding-top compartment and which is connected to a floor and laterally exterior side rail structures, a folding-top compartment bottom being connected with the rear wall.

From the article "The New Mercedes-Benz Roadster—Body: Passive Safety" in ATZ 91 (1989)5, Pages 227 to 235, a body structure is known for the rear carriage of a convertible comprising a folding-top compartment and a transversely extending rear wall disposed in front of the folding-top compartment, in which case the rear wall is connected to laterally exterior lower side rails of a side rail structure and to a floor. By means of its forward, transversely extending edge, the folding-top compartment bottom is connected with the rear wall. For achieving a sufficient torsional and bending rigidity in the case of this rear carriage, additional diagonal struts are arranged on the underbody of the vehicle.

It is an object of the present invention to significantly increase the static and dynamic torsional rigidity and the bending rigidity of the rear body structure of a convertible.

This object has been achieved according to the present invention by providing side rail structures arranged to receive forces transmitted from the rear chassis into the body structure, and an upper cross member arranged to transmit the forces to a central force flux center point, and members of a rear-wall-side hollow member structure are arranged to receive the forces, the ends of members of the hollow member structure extending away from the force flux center point and being connected to the exterior side rail structures.

One of the principal advantages achieved by the present invention is that the forces transmitted from the rearward chassis by way of the spring strut receiving devices into the body structure are, on the one hand, introduced into the side rail structures and, on the other hand, are introduced by way of an upper cross member into a central force flux center point. Depending on the load, the forces are transmitted there into several members of a rear-wall-side hollow member structure. The ends of the members of the hollow member structure facing away from the force flux center point are connected to the laterally exterior side rail structure. According to this design of the body structure in the area of the rear carriage, the static torsional rigidity is increased by approximately 20% and the bending rigidity is increased by approximately 15% in comparison to conventional rear carriage structures of convertibles.

The upper cross member, which connects the two spring strut receiving devices with one another and is connected to the upper folding-top compartment bottom and in sections to the rear wall, introduces the forces transmitted by way of the chassis into a central force flux center point. Depending on the load, they are transmitted from there by way of the members of the rear-wall-side hollow member structure arranged in an X-shape or a K-shape. This additional force flux path interacts with the existing force flux path of a conventional rear carriage floor structure. The hollow member structure is formed by a rear wall reinforcement placed onto the rear wall from the passenger compartment. The central force flux center point, which is situated in the longitudinal center plane of the vehicle, is disposed approximately at the level of the connecting area of the folding-top compartment bottom to the rear wall and is placed slightly in front of it in the hollow space between the rear wall and the rear wall reinforcement. In the area of the spring strut receiving devices, the folding-top compartment bottom is provided with circular recesses. The additional cross members of the body structure (seat cross member, lower cross member between the spring strut receiving devices, and cross member of the hollow member structure) provide an introduction or transmission of force in the body structure which is appropriate for its function.

These and other objects, features and advantages of the present invention will become more readily apparent from the following detailed description when taken in conjunction with the accompanying drawings.

DETAILED DESCRIPTION OF THE DRAWINGS

Figure 1:
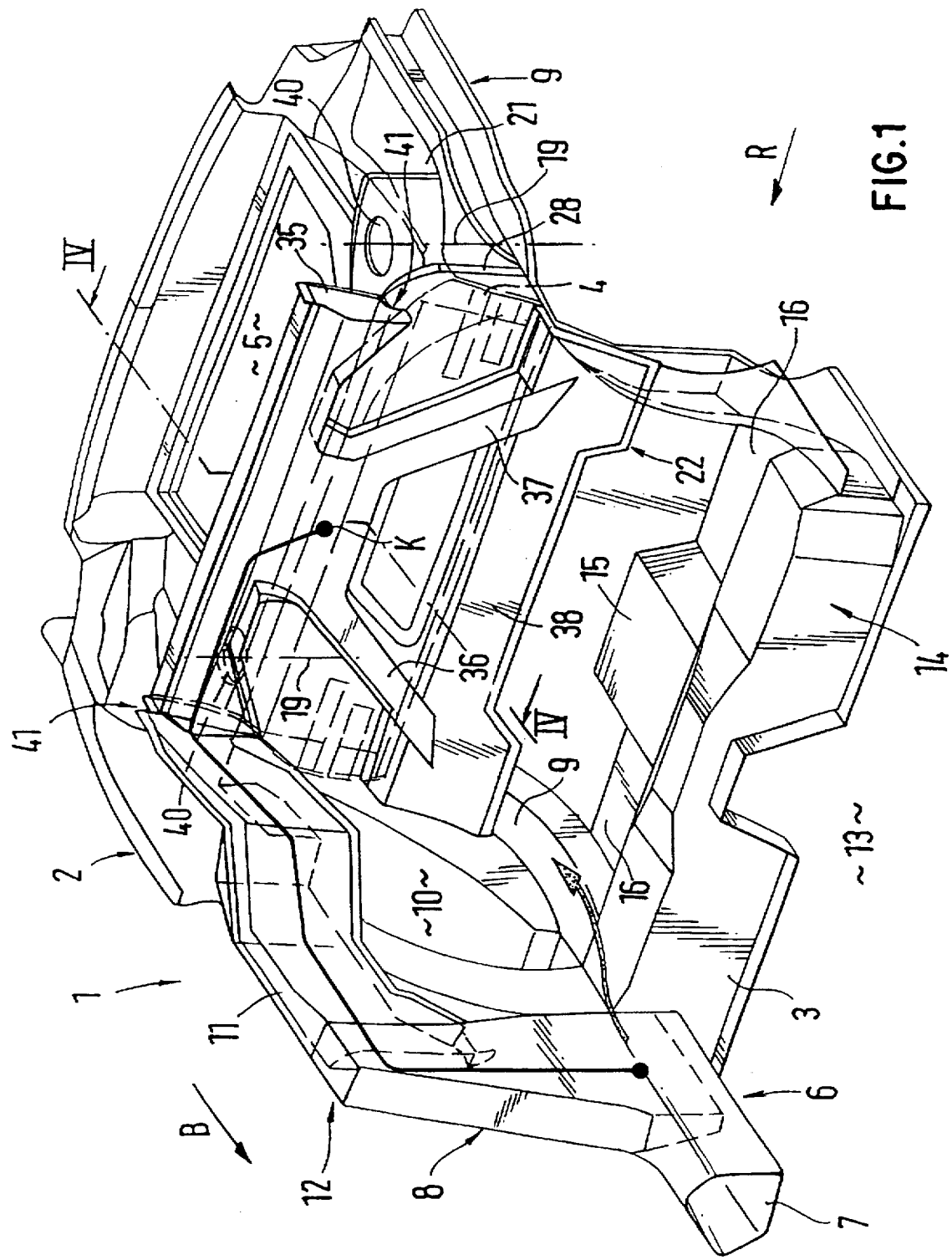
FIG. 1 is a perspective view diagonally from the front of a partial area of a body structure of a convertible according to a preferred embodiment of the invention, in which the rear-wall-side hollow member structure is approximately K-shaped.
Figure 2:
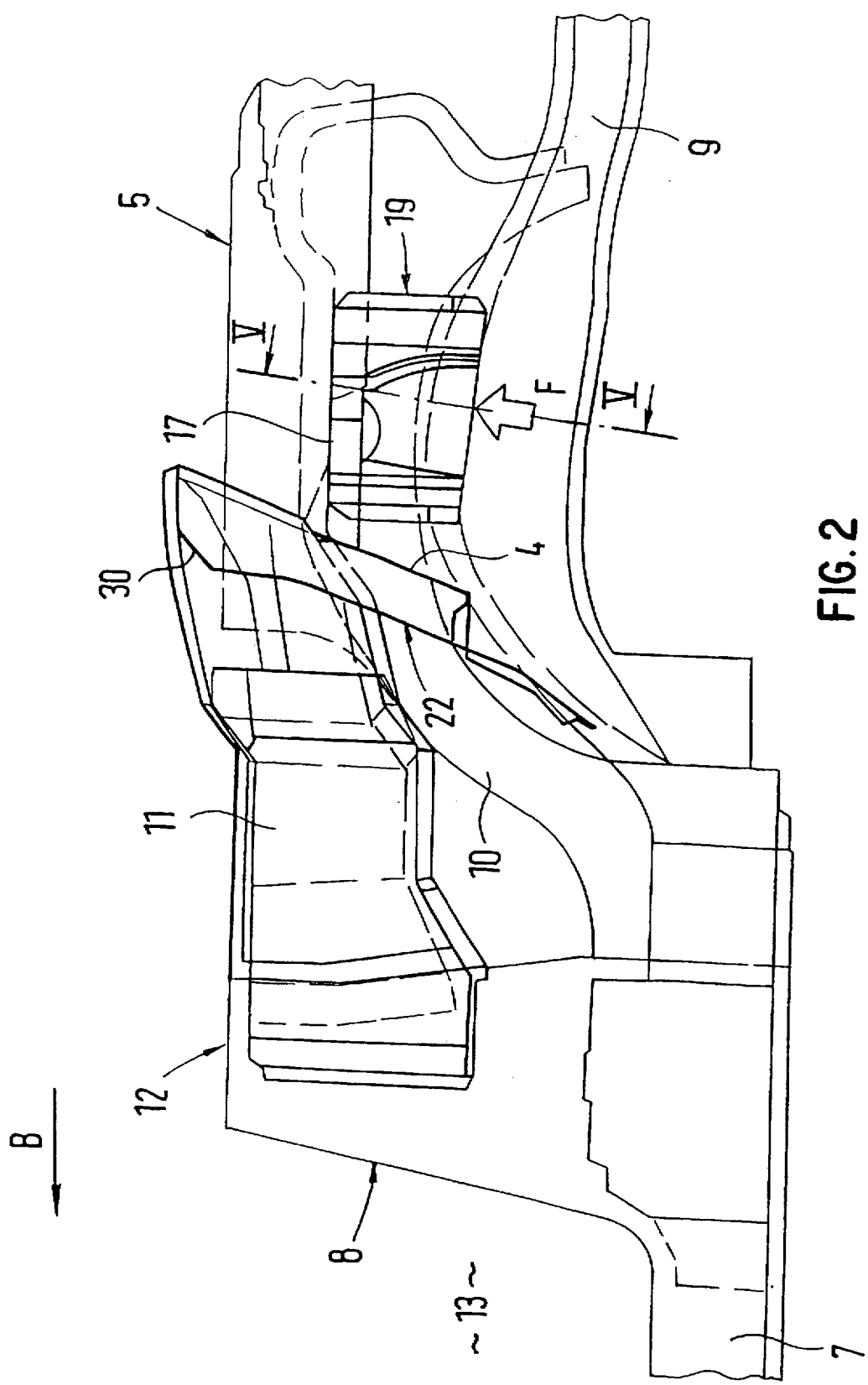
FIG. 2 is a view of the body structure in the direction of the arrow R.

A body structure 1 for a rear carriage 2 of a convertible comprises a floor 3 which, on its rearward, transversely extending edge area, is connected to a rear wall 4 of the passenger compartment 13 which is disposed in front of a folding-top compartment 5. In the upward direction, the folding-top compartment 5 is covered by a cover which is not shown in detail. In a laterally exterior area, the floor 3 is connected on both sides to side rail structures 6. Each side rail structure 6 comprises a laterally exterior side member 7 which, in the area of a B-pillar 8 or slightly farther to the rear, changes into a rearward side rail 9. The rearward side rail 9 extends in sections along the interior side of a rearward wheel house 10 and is bent at right angles toward the inside and upward. In addition, the side rail structure 6 comprises an upper side rail 11 which extends within a lateral part and extends from an upper end 12 of the B-column approximately at the level of the window toward the rear in the direction of the rear wall 4.

Directly in front of the two rearward wheel houses 10, a seat cross member 14 is provided on the side of the floor 3 facing the passenger compartment 13, which seat cross member 14 is formed by a profiled edge plate which is placed on the floor 3 on the passenger compartment side. The continuous seat cross member 14 connects the two exterior side members 7 with one another. Adjacent to a longitudinal center plane A—A of the vehicle, the floor 3 is raised and forms a longitudinally extending transmission tunnel 15 there.

Sunken seat buckets 16 extend behind the seat cross member 14 and on both sides of the transmission tunnel 15, in which case a seat cushion, which is not shown in detail, of a rear seat unit, can be inserted into each seat bucket 16. Behind the two seat buckets 16 and the transmission tunnel 15, the floor 3 is diagonally raised, the transversely extending rear wall 4 of the folding-top compartment 5 being connected to this area. Laterally, the rear wall 4 is linked to the side rail structures 6 and the interior wheel houses 10, and may also be linked on the inside to one lateral wall respectively.

The folding-top compartment 5 which, viewed in the vehicle toward a driving direction B, is situated behind the rear wall 4, comprises a folding-top compartment bottom 17 which, by way of an upright flange 18, is continuously connected to the transversely extending upward rear wall 4. The folding-top compartment bottom 17 is aligned approximately horizontally and is provided with reinforcing beads. Below the folding-top compartment bottom 17, spring strut receiving devices 19 are provided on both longitudinal sides of the body structure 1, by means of which spring strut receiving devices 19, the forces from the rearward chassis, which is not shown in detail, are introduced into the body structure 1.

Figure 5:
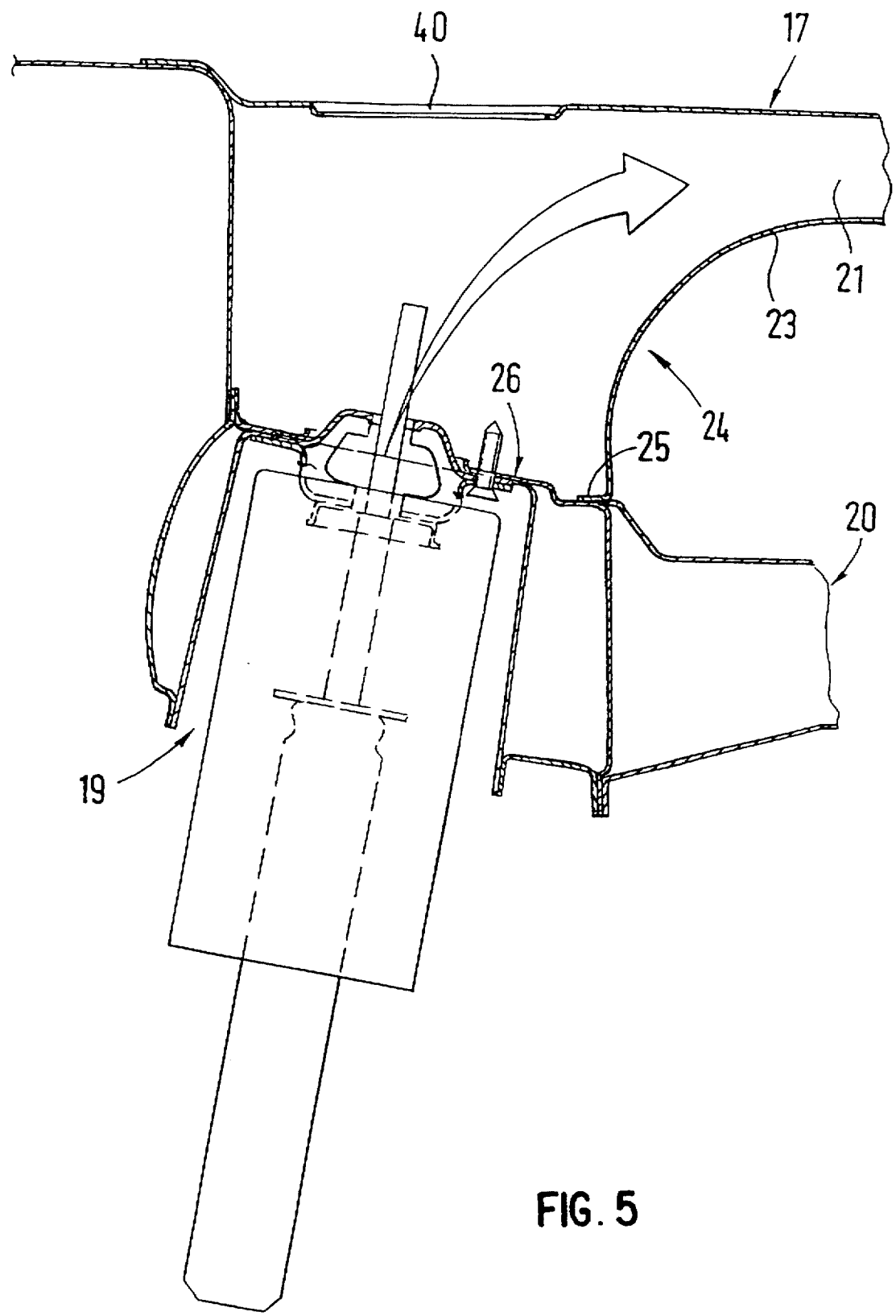
FIG. 5 is an enlarged sectional view according to Line V—V of FIG. 2 of the spring strut receiving device and the upper cross-member connected to the folding-top compartment bottom.

For reasons of stiffness, the spring strut receiving devices 19, which are connected to the inner wheel houses 10 or the rear side rails 9, are connected with one another by way of a lower cross member 20 extending approximately at the level of the spring strut receiving device 19, as shown in FIG. 5.

Figure 3:
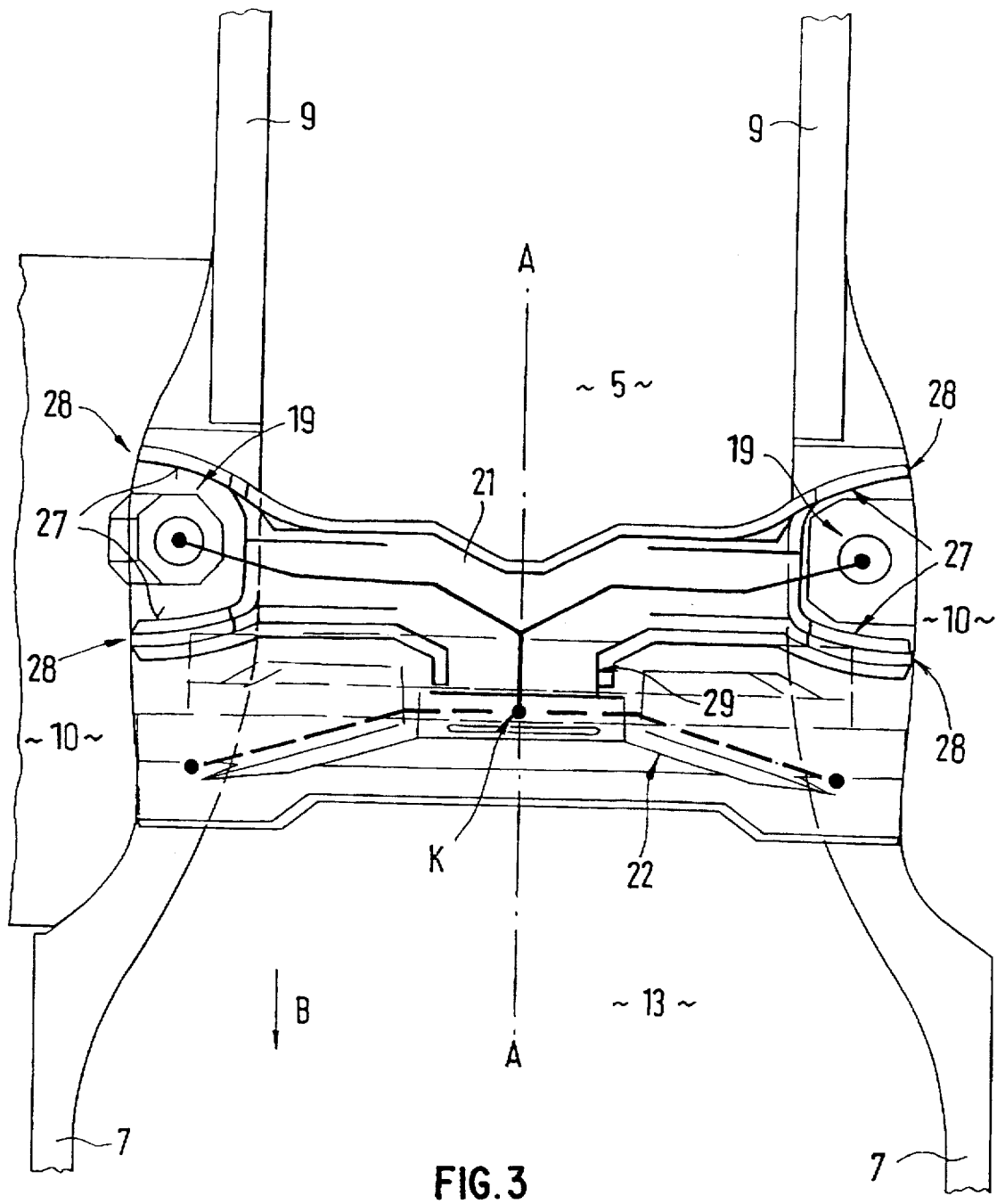
FIG. 3 is a top view of the body structure.

A remarkably high static and dynamic rigidity of the rear body structure 1 is achieved in that the forces introduced from the rearward chassis are not only introduced in the known manner into the side rear structures 6 (rearward side rail 9, side member 7, upper side rail 11) but that, in addition, the forces introduced from the chassis are guided by way of an upper cross member 21 into a central force flux center point "K" and, depending on the load, are transmitted there into several members of a hollow member structure 22, in which case the ends of the members situated away from the force flux center point K, in turn, are connected to the side rail structures 6. The upper cross member 21 is formed by an edge plate 23 which has a hat-shaped profile (upside-down U-shape 23 with outwardly extending flanges 25) when viewed from the front, as shown in FIG. 5. The edge plate 23 is placed on the underside of the folding-top compartment bottom 17, specifically approximately in the area of the longitudinal course of the rearward spring strut receiving devices 19. According to FIG. 5, the cross member 21 extends upwardly toward a center area of its transverse course at a distance above the spring strut receiving devices 19. On both laterally exterior areas 24, the upper cross member 21 extends downward so that it rests, by means of approximately horizontal flanges 25, against the top side 26 of the spring strut receiving devices 19 and is fastened there. The cross member 21 reaches around the two spring strut receiving devices 19 by means of fork sections 27, as shown in FIG. 3, and is connected by means of upright flanges 28 to the adjoining wheel houses 10. In a center area of its transverse course, the cross member 21 has a projecting shoulder 29 which projects toward the front and which extends to the adjacent rear wall 4 and is fixedly connected with it.

The hollow member structure 22 provided in the area of the rear wall 4 is formed essentially by the rear wall 4 and a fitted-on rear wall reinforcement 30, the rear wall reinforcement 30 being provided on the side of the rear wall 4 facing the passenger compartment 13. Depending on the construction of the rear wall reinforcement 30, an X-shaped or K-shaped hollow member structure 22 is created.

Figure 8:
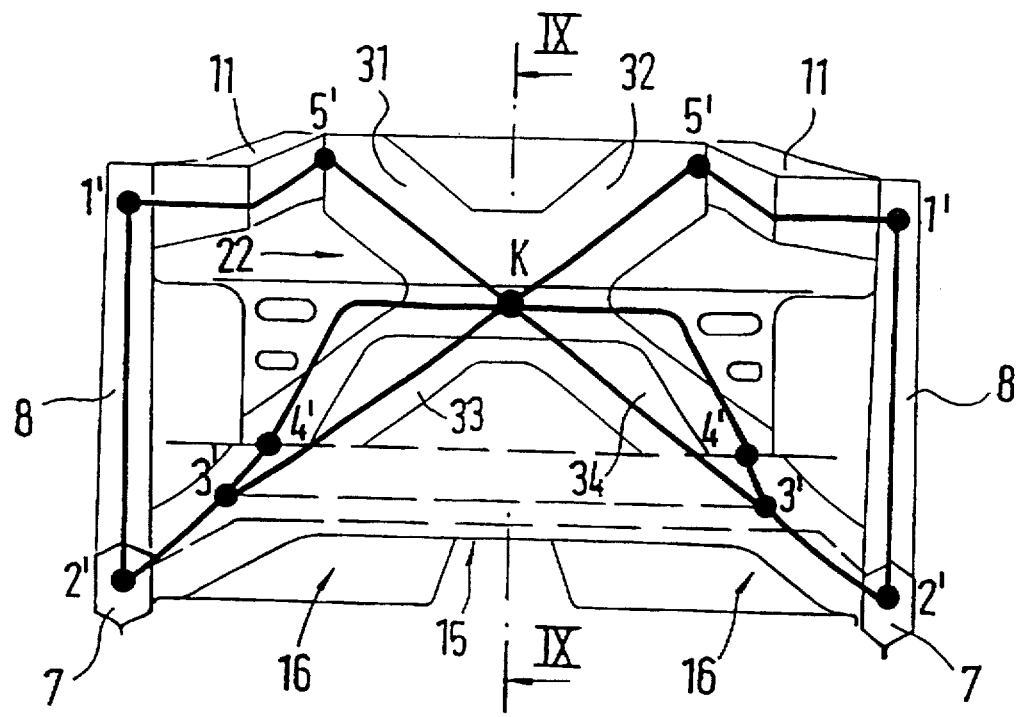
FIG. 8 is a frontal view of the body structure with the X-shaped member arrangement of the rear-wall-side hollow member structure.
Figure 9:
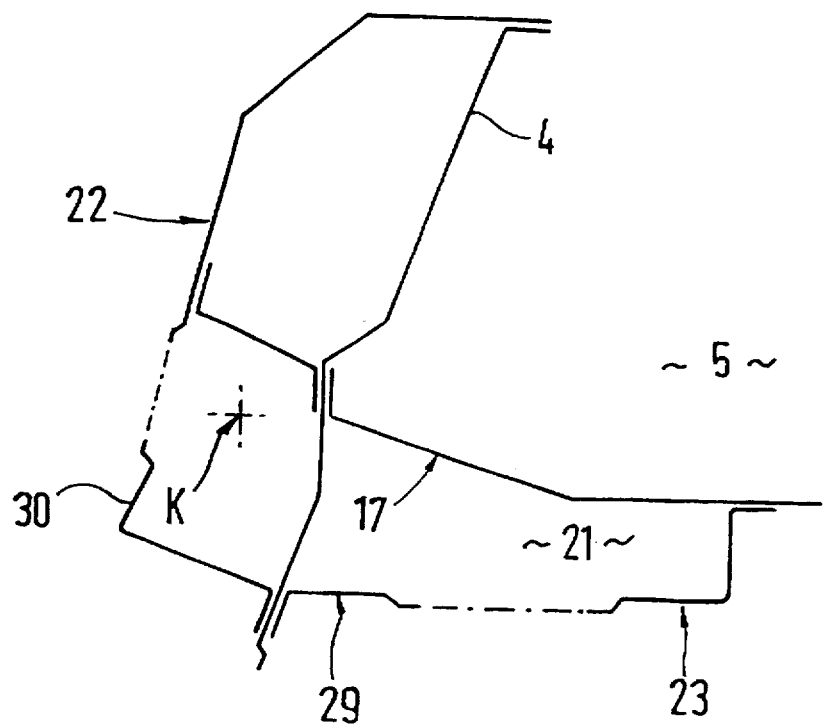
FIG. 9 is an enlarged sectional view according to Line IX—IX of FIG. 8.
Figure 10:
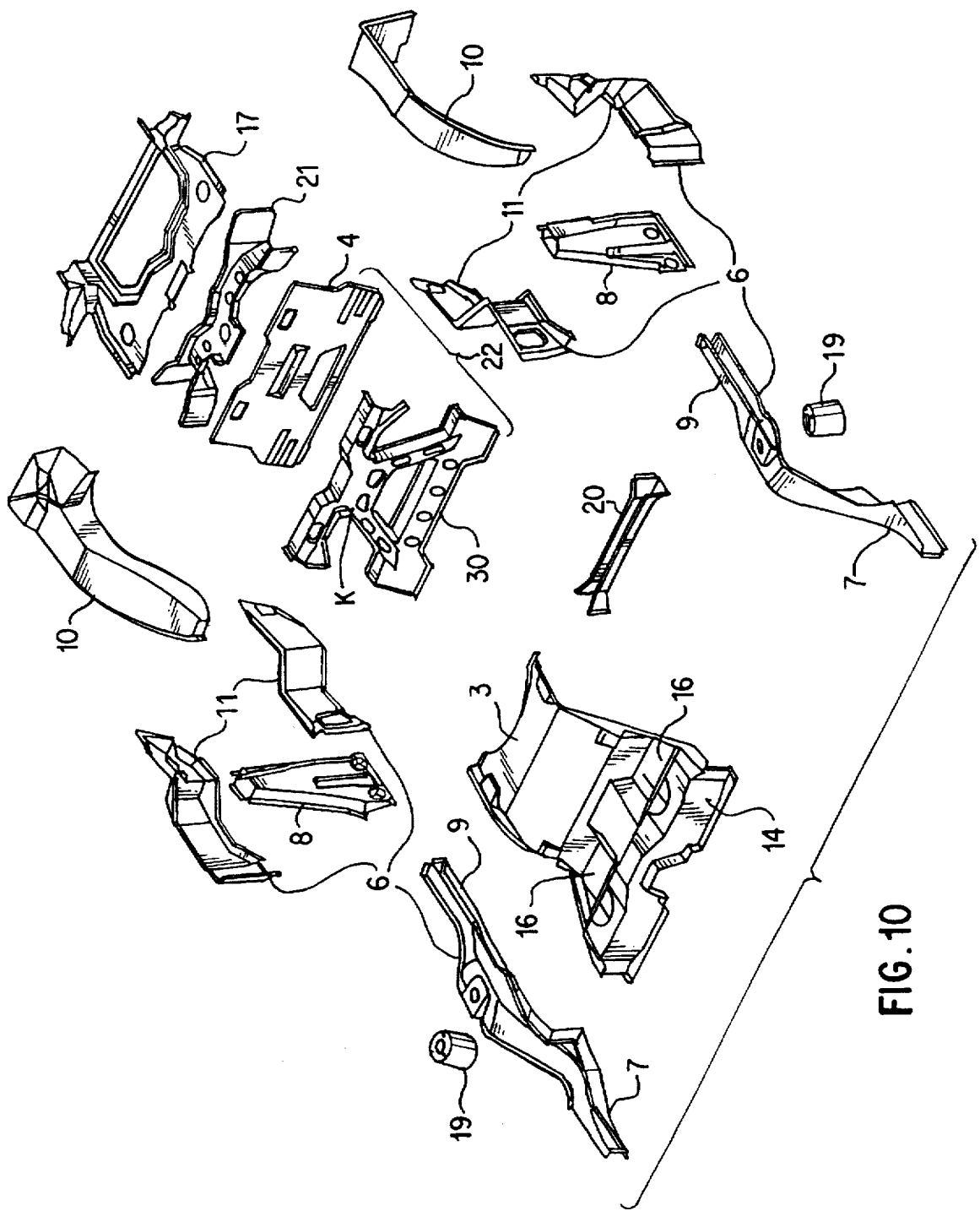
FIG. 10 is an exploded perspective view of the body structure.

In FIG. 8, the members 31, 32, 33 and 34 of the hollow member structure 22 extend in an X-shaped manner from the central force flux center point K toward the outside.

FIG. 1 illustrates an approximately K-shaped arrangement of the hollow member structure 22. In this case, the rear wall reinforcement 30 and the rear wall 4 form a transversely extending upper member 35 which is aligned approximately horizontally and is fixedly connected on its two extreme ends 41 with the rearward ends of the upper side rails 11 of the side rail structures 6. In the area of the longitudinal center plane A—A of the vehicle, the transversely extending upper member 35 extends downward in sections and is divided into two diagonally extending, downwardly and outwardly directed members 36, 37 which lead into a lower cross member 38. The lower cross member 38 is formed by the raised floor 3 and the rear wall reinforcement 30. The lower cross member 38 is connected to the wheel houses 10 and is placed onto the rearward side rails 9.

Figure 4:
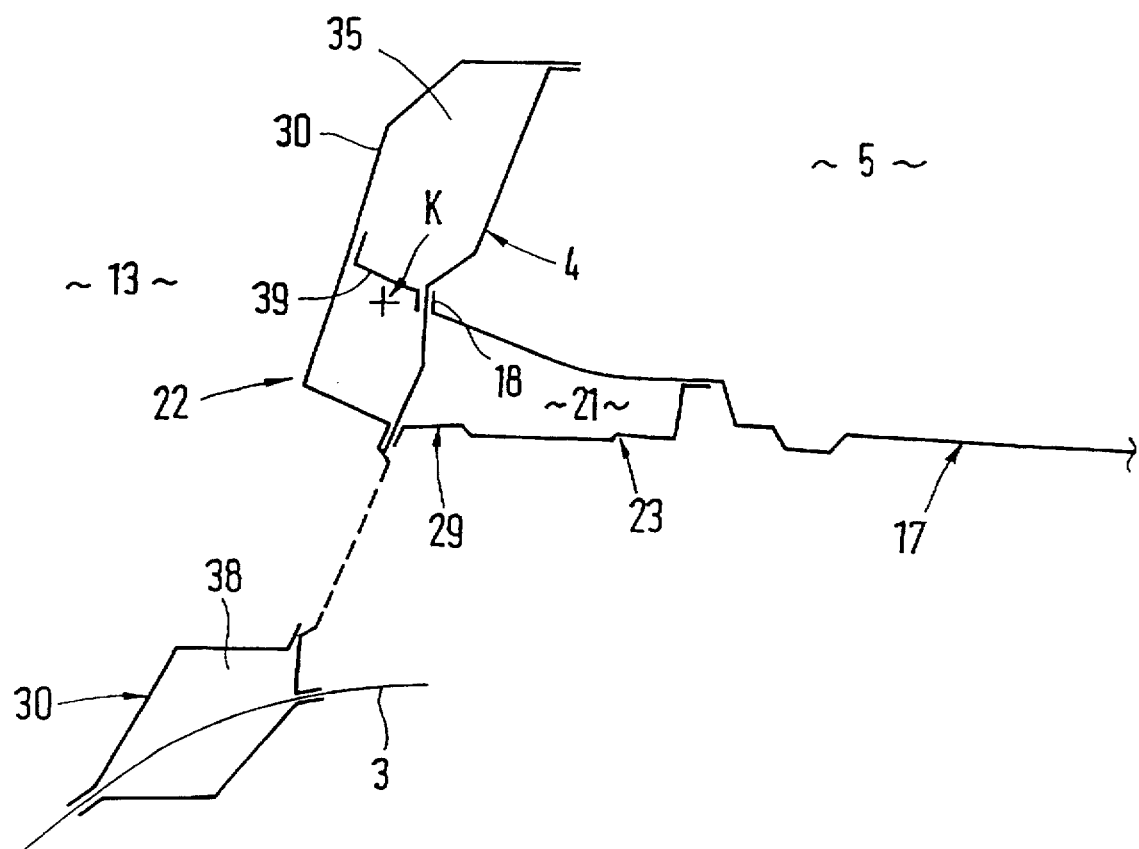
FIG. 4 is a sectional view according to line IV—IV of FIG. 1.

In the longitudinal center plane A—A of the vehicle, the upper cross member 21, which is connected to the spring strut receiving devices 19 and to the folding-top compartment bottom 17, is connected with the rear side of the rear wall 4, opposite the rear wall reinforcement 30 situated on the other side of the rear wall 4. Approximately at the level of the connection of the folding-top compartment bottom 17, the rear wall reinforcement 30 is divided by means of an interior reinforcement 39, into two hollow member sections disposed above one another as shown in FIG. 4. Slightly below the reinforcement 39 and disposed in front of the rear wall 4, the central force flux center point K is situated in the longitudinal center plane A—A of the vehicle. The members 35 to 38 originating from the force flux center point K, as shown in FIG. 1, form a K-shape. The members 31 to 34 originating from the force flux center point K, as shown in an alternative embodiment in FIG. 8, form an X-shape.

By the introduction of the forces from the chassis into the side rail structures 6 and the additional force flux path by way of the upper cross member 21 and the hollow member structure 22, a significant increase of the static torsional rigidity by approximately 20% is achieved and an increase of the bending rigidity of approximately 15% is achieved, as compared to conventional body structures.

Figure 6:
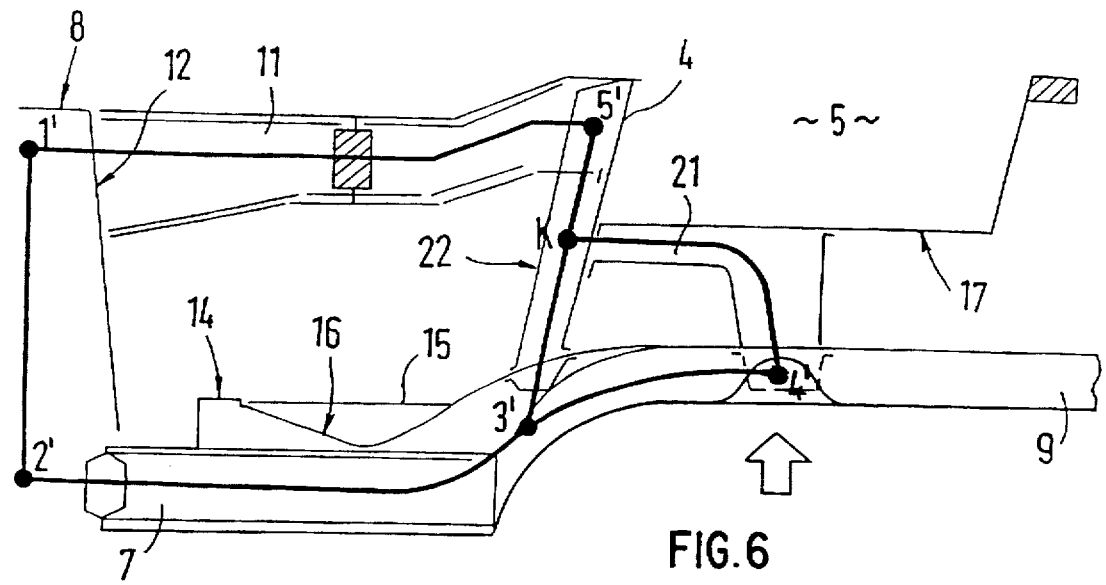
FIG. 6 is a lateral view of another embodiment of the body structure with an approximately X-shaped development of the members with the force flux course.
Figure 7:
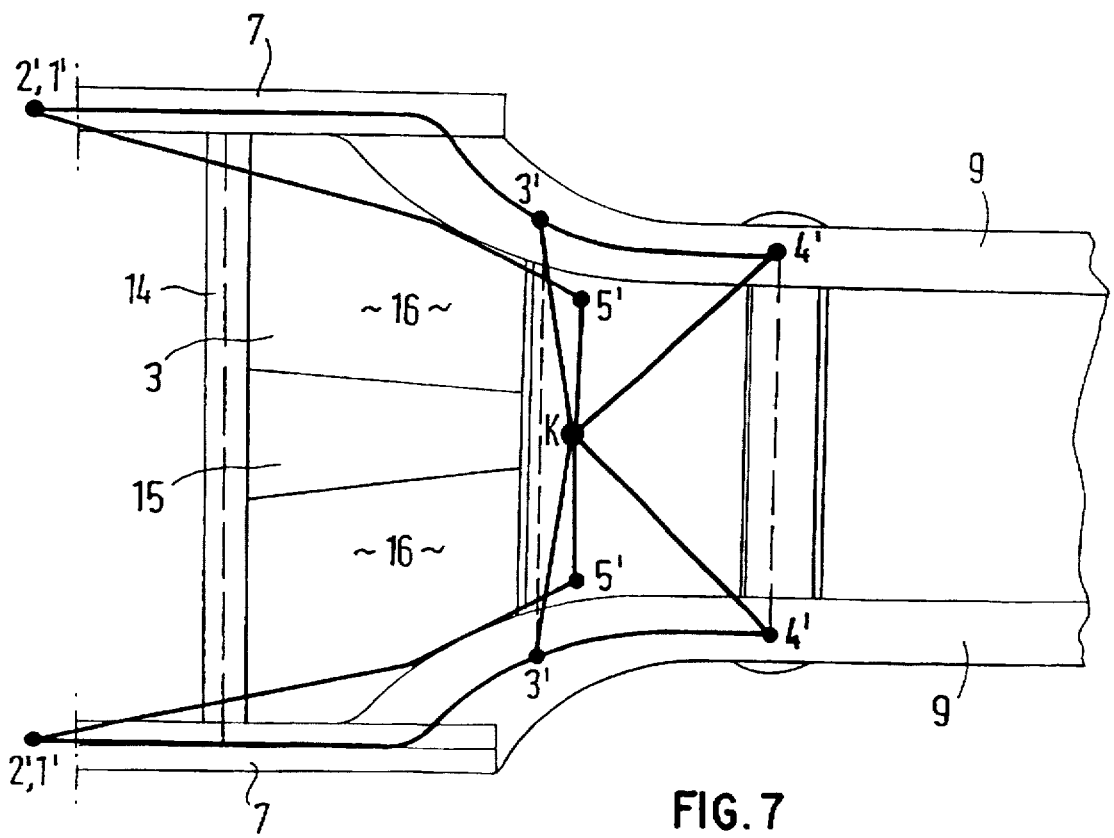
FIG. 7 is a top view of FIG. 6 with the force flux course.

In FIGS. 6 to 8, the force flux path of the forces introduced from the rear axle by way of the spring strut receiving devices 19 is shown schematically by reference numbers 1' to 5'. The introduction takes place at 4' and is conducted by way of the upper cross member 21 into the central force flux center point K. Depending on the load, the forces are transmitted from the central force flux center point K either by way of 5' and 1' to 2' or by way of K and 3' to 2', or by way of the two side rail structures 6. Above the spring strut receiving devices 19, the folding-top compartment bottom 17 is provided with circular recesses or openings 40, as shown in FIG. 5.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Body structure for a rear carriage of a convertible, comprising:

a pair of laterally exterior side members;

a rear wall extending transversely between said pair of laterally exterior side members and separating a passenger compartment from a folding top compartment;

a folding top compartment bottom connected to a rear side of said rear wall, said folding top compartment bottom defining a bottom of said folding top compartment;

an edge plate connected to a lower side of said folding top compartment bottom to define a transversely-extending hollow cross member, said edge plate being connected to said rear side of said rear wall at a transverse central location; and a rear wall reinforcement attached to a front side of the rear wall to define a hollow member structure, said rear wall reinforcement having a central portion attached to the rear wall directly in front of said transverse central location, and having a pair of lower members, each extending from said central portion toward a respectively one of said pair of laterally exterior side members.

2. Body structure according to claim 1, wherein said lower members extend essentially diagonally downwardly from said central portion.

3. Body structure according to claim 1, wherein said rear wall reinforcement includes an upper member extending essentially transversely.

4. Body structure according to claim 1, wherein said rear wall reinforcement includes a lower cross member connecting lower ends of said lower members.

5. Body structure according to claim 1, further comprising a pair of upper side rails arranged above said pair of laterally exterior side members and extending rearwardly from a pair of B-columns, said pair of upper side rails having rearward ends which are connected to at least one of said rear wall reinforcement and said rear wall.

6. Body structure according to claim 3, further comprising a pair of upper side rails arranged above said pair of laterally exterior side members and extending rearwardly from a pair of B-columns, said at least one upper member being connected to rearward ends of said pair of upper side rails.

7. Body structure according to claim 1, further comprising a floor, said rear wall and said rear wall reinforcement each being attached to said floor.

8. Body structure according to claim 4, further comprising a floor, said rear wall and said lower cross member each being attached to said floor such that a hollow space is defined therebetween.

9. Body structure according to claim 3, wherein said upper member extends essentially horizontally, and said lower members extend essentially diagonally downwardly from said central portion, such that said upper member and said diagonal members essentially form a K-shape.

10. Body structure according to claim 3, wherein said upper member includes a pair of members extending diagonally upwardly from said central portion, and said lower members extend essentially diagonally downwardly from said central portion, such that said at least one upper member and said diagonal members essentially form an X-shape.

11. Body structure according to claim 1, further comprising an interior reinforcement connected to a front side of the rear wall essentially opposite said folding top compartment bottom, said interior reinforcement being connected to a rear side of said rear wall reinforcement.

12. Body structure according to claim 1, wherein each of said laterally exterior side members is bent inwardly and upwardly proximate a respective rearward wheel house.

13. Body structure according to claim 1, wherein the edge plate is connected with spring strut receiving devices.

14. Body structure according to claim 13, wherein said spring strut receiving devices are constructed on one of the laterally exterior side rails and wheel houses, said spring strut receiving devices being connected with one another by a lower cross member.

15. Body structure according to claim 14, wherein said edge plate includes fork sections which extend around the spring strut receiving devices.

16. Body structure for a convertible, comprising:

a transversely extending rear wall separating a passenger compartment from a folding top compartment; and a rear wall reinforcement attached to a front side of the rear wall to define a hollow member structure, said rear wall reinforcement including:

at least one upper member extending essentially transversely, and at least two diagonal members extending diagonally downwardly from a transverse central portion of said at least one upper member.

17. Body structure according to claim 16, wherein said rear wall reinforcement further includes a lower cross member connecting lower ends of said at least two diagonal members.

18. Body structure according to claim 16, further comprising a pair of laterally exterior side members, said rear wall extending transversely between said pair of laterally exterior side members, said diagonal members having lower ends which are connected to said pair of laterally exterior side members.

19. Body structure according to claim 18, wherein said rear wall reinforcement further includes a lower cross member connecting lower ends of said at least two diagonal members, said lower cross member engaging said pair of laterally exterior side members.

20. Body structure according to claim 18, further comprising a pair of upper side rails arranged above said pair of laterally exterior side members and extending rearwardly from a pair of B-columns, said at least one upper member being connected to rearward ends of said pair of upper side rails.

21. Body structure according to claim 16, further comprising a floor, said rear wall and said rear wall reinforcement each being attached to said floor.

22. Body structure according to claim 17, further comprising a floor, said rear wall and said lower cross member each being attached to said floor such that a hollow space is defined therebetween.

23. Body structure according to claim 16, wherein said at least one upper member and said rear wall define a hollow space therebetween, and wherein each of said at least two diagonal members and said rear wall define a hollow space therebetween.

24. Body structure according to claim 16, wherein said at least one upper member extends essentially horizontally, such that said at least one upper member and said diagonal members essentially form a K-shape.

25. Body structure according to claim 16, wherein said at least one upper member includes a pair of members extending diagonally upwardly from said transverse central point, such that said at least one upper member and said diagonal members essentially form an X-shape.

26. Body structure according to claim 16, further comprising a folding top compartment bottom connected to a rear side of the rear wall behind said transverse central portion, said folding top compartment bottom defining a bottom of said folding top compartment.

27. Body structure according to claim 26, further comprising an interior reinforcement connected to a front side of the rear wall essentially opposite said folding top compartment bottom, said interior reinforcement being connected to a rear side of said rear wall reinforcement.

28. Body structure according to claim 16, further comprising a transversely extending edge plate connected to a rear side of the rear wall behind said transverse central portion.

29. Body structure according to claim 28, wherein said edge plate is connected at each end to a spring strut receiving device.

30. Body structure for a rear carriage of a convertible, comprising:
- a pair of spring strut receiving devices;
- a pair of laterally exterior side members;
- a rear wall extending transversely between said pair of laterally exterior side members and separating a passenger compartment from a folding top compartment;
- a folding top compartment bottom connected to a rear side of said rear wall, said folding top compartment bottom defining a bottom of said folding top compartment; and
- an edge plate connected to a lower side of said folding top compartment bottom to define a transversely-extending hollow cross member, said edge plate being connected to said rear side of said rear wall at a transverse central location, and said edge plate being connected at its ends to said spring strut receiving devices.

\* \* \* \* \*